United States Patent Office 3,037,387
Patented June 5, 1962

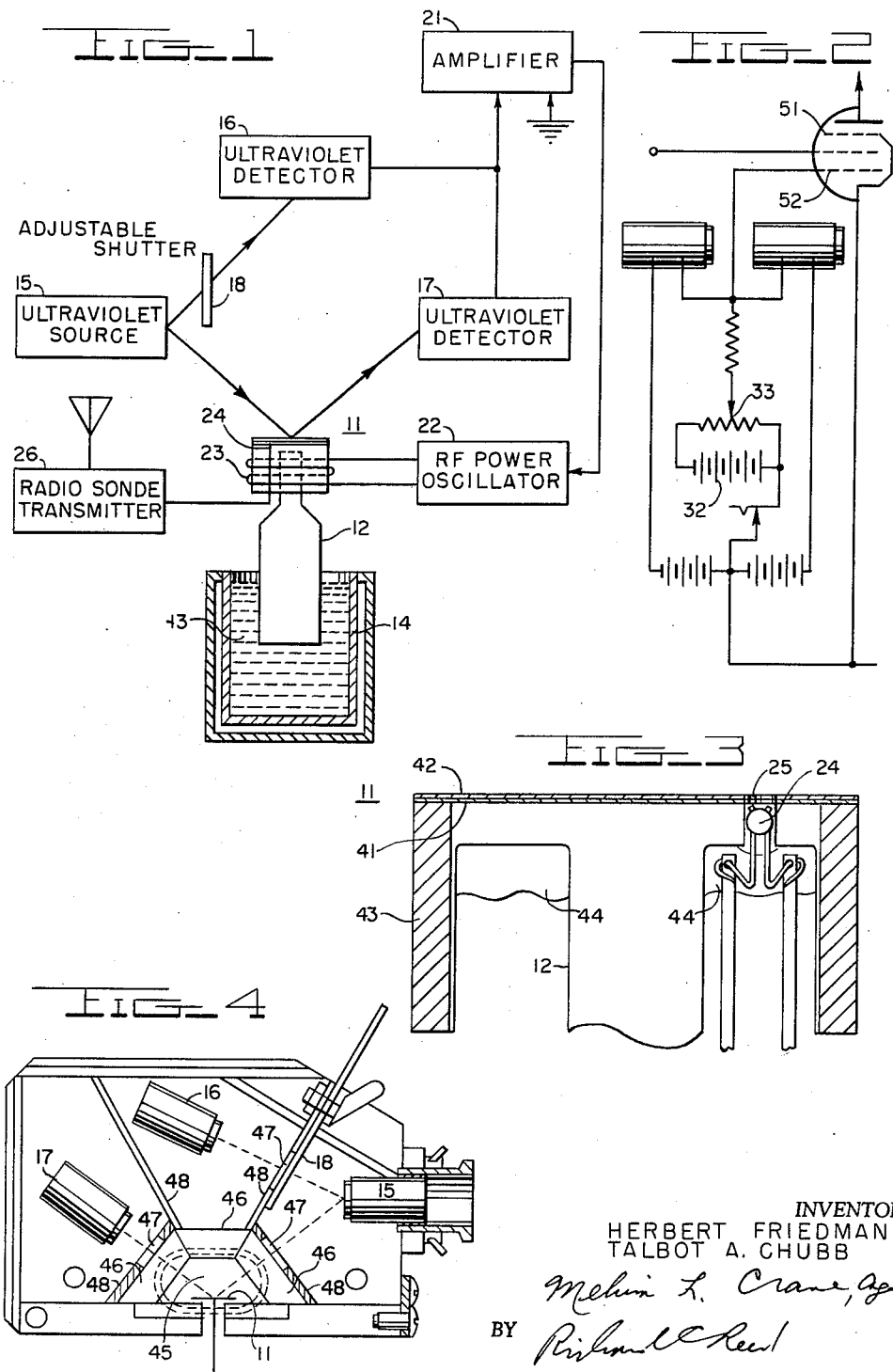

3,037,387
DEW POINT INDICATOR
Herbert Friedman, 2643 N. Upshur St., Arlington, Va., and Talbot A. Chubb, Forest Heights, Md. (319 Onondaga Drive, Washington 21, D.C.)
Filed Apr. 29, 1960, Ser. No. 25,803
4 Claims. (Cl. 73—336.5)
(Granted under Title 35, U.S. Code (1952), sec. 266)

The invention described herein may be manufactured and used by or for the Government of the United States of America for governmental purposes without the payment of any royalties thereon or therefor.

The present invention is directed to dew point indicators and more particularly to a dew point indicator or hygrometer for more accurately determining dew points at varying temperatures and pressures.

Heretofore dew point indicators have been developed which detect dew point by the appearance of a condensation film of water vapor on a mirror surface. A light beam reflected from the mirror surface is picked up by a photocell to provide a signal to indicate the temperature at the dew point. These prior art devices require a relatively thick condensation film which requires long build-up time of the film to determine the dew point. Especially at very low pressures and temperatures the appearance of the film is relatively poorly defined and therefore an accurate determination can not be made.

The present invention overcomes the disadvantages of the prior art devices and provides a very sensitive system which is capable of detecting a condensed film of a monomolecular layer at very low pressures and temperatures as well as at the higher temperatures at which the prior art devices operate. The present system being more sensitive, provides a more accurate device and a means for determining dew points more quickly.

It is therefore an object of the present invention to provide a dew point indicator operable at low pressures and temperatures and sensitive to a monomolecular layer of condensation.

Another object is to provide a dew point indicator using a condensation method capable of detecting the slightest amount of condensation appearing on a mirrored surface which is much faster than known methods.

Another object is to automatically detect any change in dew or frost point.

Still another object is to provide a dew point indicator which is capable of operation in rocket and balloon flights as well as at ground level.

Yet another object is to automatically determine humidity at high altitudes.

While still another object is to provide a dew point indicator capable of detecting dew point in the presence of visible light thereby not requiring a light tight chamber.

Another object is to provide a device capable of detecting deposition of a thin film on a reflective surface.

Other objects and features of the present invention will become apparent to those skilled in the art as the disclosure is made in the following description of a preferred embodiment of the invention as illustrated in the accompanying drawings in which:

FIG. 1 illustrates a block diagram of a system for determining dew point;
FIG. 2 illustrates a schematic diagram of the power supply and electrical control for the ultraviolet detectors;
FIG. 3 illustrates a cross sectional view of the mirror; and
FIG. 4 is a side view illustrating the relationship of the optical parts of the system.

The present invention is directed to a lightweight automatic dew point instrument which detects prevailing dew point by the appearance of a condensation film of water vapor on a mirror surface. The instrumentation of the present device behaves as a servo system acting to maintain a constant dew spot size on the mirror surface. A thermistor is secured in a hole in the mirror surface to determine the temperature thereof and to feed the resultant temperature to a suitable recorder. In use of the instrument as an airborne dew point detector, the temperature of the thermistor is directed to a radiosonde instrument which transmits the information to a ground recorder.

The device makes use of an ultraviolet light source with a strong emission in the neighborhood of Lyman-$\alpha$ (1216 Angstrom units) and a narrow band width detector which is sensitive to Lyman-$\alpha$ of about 1216 A. and insensitive to much longer or shorter wavelengths. Such a device is sensitive to a monomolecular layer of condensation or other thin films on a mirrored surface and it has been determined that such a layer will reduce the reflectivity of an aluminum surface coated with a layer of magnesium fluoride to less than 10 percent. Such a device is fast compared to prior art devices making use of visible light since visible light requires a much thicker film which also requires a longer build-up time for the film. Ultraviolet light with a strong emission in the neighborhood of Lyman-$\alpha$ (1216 Angstrom units) and a sensitive Lyman-$\alpha$ detector is used in order that the device can be operated in day light or in the visible range without the need of special light tight equipment or packaging. Also, the Lyman-$\alpha$ arrangement is more sensitive than devices that operate in the visible range. Throughout the specification and claims 1216 A. means 1216 Angstrom units.

Now referring to the drawings, FIG. 1 illustrates in block diagram a preferred dew point detecting system made in accordance with the present invention. The system includes a mirror surface 11 which is cooled by a cold-rod or cooling stem 12 inserted into a cooling medium 13 such as Dry Ice maintained in a Dewar flask 14. An ultraviolet source 15 with a strong emission in the negihborhood of Lyman-$\alpha$ (1216 A.) is directed onto the mirrored surface and reflected onto narrow band ultraviolet detector tubes such as ionization chambers 16 and 17 which are sensitive to Lyman-$\alpha$ (1216 A.) and insensitive to longer or shorter wavelengths. A shutter 18 is positioned between the ultraviolet source and tube 16 to control the amount of light from the source directed directly onto the tube, the purpose of which will be explained later. The outputs of the detector tubes oppose each other and the resultant is fed to the grid of an input tube of an amplifier 21 to control the output of the amplifier. The input tube is also biased by a potentiometer and battery to further control the output of the amplifier as shown by FIG. 2. The output of the amplifier is directed to a RF power oscillator 22 which is connected with a heating coil 23 that surrounds the mirrored surface and heats the mirrored surface in accordance with the output of the detector tubes connected with the grid of the input tube of the amplifier.

A dew point thermistor 24 as shown in FIG. 3 is positioned in a hole 25 in the mirror surface offset with respect to the center thereof. The thermistor is connected with a radiosonde 26 which for airborne devices transmits a signal to a ground recorder. The signal transmitted is "in" terms of the temperature of the mirrored surface from which the dew point is determined and is equal to the dew point.

FIG. 2 illustrates a schematic of the power supply for the detectors in which the detectors are connected to a power supply source such that they are opposing each other. A bias battery 32 and adjusting potentiometer 33 are introduced into the load circuit to the detectors in order to adjust each unit for variations in the characteristic of the amplifier input tube in order to control the output of the amplifier and subsequently the spot size on the dew point mirror. The adjustable shutter 18 positioned between the detector 16 and the ultraviolet source 15 is adapted to be manually adjusted to aid in controling the light directly incident on detector 16. Controlling the light incident on detector 16 permits further control of the detector system to control the dew point spot size on the mirror. These adjustments are made during the set up prior to flight of the instrumentation.

Since dew point detectors are operated at varying temperatures and pressures the mirrored surface must be of a material that will withstand both the changing temperature and pressure. It has been determined that aluminum surfaces can be made with good reflecting surfaces, however, aluminum oxidizes easily which cuts down on the reflectivity of the surface. For the purposes of the present invention, an aluminum surface 41 is coated with an evaporated layer of magnesium fluoride ($MgF_2$) 42 having a thickness of about 250 Angstrom units to provide a mirrored surface of greater reflectivity. Not only does a coating of $MgF_2$ produce a surface with greater reflectivity but also prevents the growth of oxide on the aluminum and helps to preserve the mirror surface from deterioration. FIG. 3 ilustrates the cross section of a suitable mirror surface made integral with a cold rod 12 of copper or any other suitable metal for maintaining the mirror surface at a constant cold temperature. The cold rod extends upward into a wafer like head to which a skirt 43 of iron is brazed to the outer surface. The head is then coated with a layer of aluminum 41 by any suitable evaporation technique and then a thin layer of magnesium fluoride 42 is evaporated onto the aluminum coating before appreciable oxidation of the aluminum takes place. Such a coating provides a mirror surface of about 90% reflectivity. It has been determined that a subsequent deposition of even a monomolecular layer of condensation reduces the reflectivity to less than 10%.

An induction heating coil of wire 23 is positioned about the iron ring skirt 43 and connected with the RF power oscillator 22 to heat the mirrored head on the cold rod. A hole 25 is drilled through the mirrored surface at a position about midway between the skirt and center of the cold rod and the thermistor 24 is mounted therein by any suitable manner such as by Dow Corning 1360 silicone wire enamel 44 and cured at about 400° F. for about four hours to provide an even temperature, the enamel is extended entirely around the cold rod. By positioning the thermistor in this manner, during operation, the thermistor senses the temperature of the mirror face just at the edge of the dew or frost spot. Due to the coolant applied to the cold rod and the heat applied about the edge, the temperature at the center of the mirror is colder than that at the mirror edge. Therefore the dew point is actually the mirror temperature at the radius of the dew spot which is at the position of the thermistor. Consequently, the thermistor measures the temperature of the mirror at the spot which is also a measure of the dew point temperature.

In FIG. 4 there is shown a side view which illustrates the relationship of the ultraviolet source to the mirror and the detectors or ionization chambers. The mirror 11 is positioned on one side of an air chamber 45 which is formed with sides 46 of Plexiglas or any suitable material. The ultraviolet light from soruce 15 falls on the mirror and detector 16 through apertures 47 in the metal supports 48, positioned between the source 15 and the detector 16, and beween the source, the mirrored surface 11 and the detector 17. The chamber does not have to be light proof since the detector tubes can operate in visible light without affecting the operation of the tubes.

A suitable ultraviolet source is one with a strong emission in the neighborhood of Lyman-α (1216 A.) produced by a hydrogen glow tube with a lithium fluoride (LiF) window with tungsten electrodes and filled with from abount 0.2 mm. Hg to about 2.0 mm. Hg. The detector tubes can be any suitable Lyman-α detector sensitive to about (1216 A.) such as a nitric oxide ion chamber with a lithium fluoride window. The output of the ionization tube is proportional to the number of photons entering the ion chamber which are dependent on the amount of ultraviolet light received by the detector from the source or reflected by the mirrored surface.

In operation of the servo system for determining dew or frost point, for instance for an upper air flight, Dry Ice or any other suitable coolant is positioned about the cold rod which maintains the mirror head at a very cold temperature. When the mirror surface reaches a constant temperature, the power supply to the various elements of the servo system is turned on and then the instruments are adjusted for correct dew spot size on the mirror surface. This adjustment is carried out by adjusting the shutter to control ultraviolet light that shines onto ionization chamber 16 and then adjusting the potentiometer setting of the bias battery and potentiometer for a fine adjustment of the amplifier output. The bias battery and potentiometer is set such that the input tube 51 of the amplifier is controlled to provide a dew or frost spot on the mirror of a desired size. A desired frost spot size is one in which the radius of the frost spot extends outwardly from the center of the mirror to the hole 25 in which the thermistor is positioned. After the setting for the correct frost spot size, the device is ready for flight. During flight, air is directed through an inlet tube over the mirror surface and as the air moves across the mirror surface, the moisture condenses onto the mirror surface which is cooled by the Dry Ice or any other suitable cooling means. As the moisture condenses onto the mirror surface, the reflectivity of ultraviolet light incident onto the mirror is decreased, consequently, the light reflected to the ionization chambers is less. Since light from the light source passing through the shutter is incident on one of the ionization chambers, the ionization chamber receiving the light directly from the source will have a greater output than the ionization chamber receiving only the light reflected from the mirror. Since the output of one detector tube is greater than the other, a current will flow to the grid 52 of the input tube of the amplifier which permits greater output of the amplifier. The amplifier output is fed to the RF power oscillator to increase the output thereof. Operation of the RF power oscillator in accordance with the increased output from the amplifier will provide more heat about the skirt of the mirror head to heat the mirror from the outer surface toward the center. The increased heat will prevent the dew or frost spot from increasing beyond the thermistor as determined by the presetting of the instrumentation.

During the operation of the servo system to control the dew spot, the thermistor continually measures the temperature of the mirror surface and feeds the indicated temperature information to a radio sonde transmitting device. The radio sonde signal is received by a ground receiver where the information is recorded as an indication of the dew point of the prevailing atmosphere at the altitude of the instrumentation in flight. The operation of the equipment is automatic and as the dew point changes the operation of the equipment changes to account for the dew point change. The instrumentation will provide an accurate recording of the dew point so long as the mirror is maintained at a cold temperature by the coolant about the cold rod and the batteries operate sufficiently to transmit the information.

The instrumentation of the present invention can be used as a ground instrument for determining dew point by replacing the radio sonde transmitting device with a suitable recorder or indicator which would record or indicate the temperature measured by the thermistor. Thus by a minor change, the instrument can be used as an airborne or a ground device.

The device has been described as being useful for determining dew point; however, the device can be used for other uses with a slight modification. For instance, in a simplified system in which the output of the amplifier is fed directly to a recorder or indicator, the teaching can be applied to detection of thin films on any reflective surface. Thus the device can be used as a detector in determining whether a surface has sufficient coating or film thickness. A good example for which the instrument could be used is to detect a teflon film applied to a surface for lubricating purposes. It can be seen that the device will have many other applications as well.

The use of two detectors makes a very sensitive device; however, the device can be used with only one detector where the sensitivity is not so critical. In the use of only one detector, the light from the reflecting surface would be directed into only one detector and the output of that one detector would then be fed to the amplifier and subsequently on to a recorder or indicator such as a light, a bell, etc. In detecting a film on a surface, the device can be set up to determine a film that is not thick enough as well as one that is too thick.

Obviously many modifications and variations of the present invention are possible in the light of the above teachings. It is therefore to be understood that within the scope of the appended claims the invention may be practical otherwise than as specifically described.

What is claimed is:

1. An improved apparatus for determining dew point which comprises the combination of an optical-electrical servo system for controlling the dew spot size on a mirror surface and a thermistor positioned relative to said mirror surface to measure the temperature of the mirror surface, the measure of which is the dew point, the improvement comprising an ultraviolet light source with a strong emission in the neighborhood of about Lyman-α (1216 A.), a magnesium fluoride coated aluminum reflective surface having a reflectivity of about 90% for incident light received from said Lyman-α light source, and at least one ionization chamber sensitive to said Lyman-α light source reflected by said reflective surface and adapted to produce an output signal relative to the light received from said reflective surface.

2. An improved apparatus for determining dew point which comprises the combination of an optical-electrical servo system for controlling the dew spot size on a mirror surface and a thermistor positioned relative to said mirror surface and the dew spot to measure the temperature of the mirror surface, the measure of which is the dew point, the improvement comprising a hydrogen glow tube with a lithium fluoride window that produces a light source with a strong emission in the neighborhood of about Lyman-α (1216 A.), an aluminum reflective surface having a magnesium fluoride coating thereon with a reflectivity of about 90% for incident light received from said hydrogen glow tube, and at least one ionization chamber sensitive to said Lyman-α light source reflected by said reflective surface and adapted to produce an output signal relative to the light received from said reflective surface.

3. An improved apparatus for determining dew point which comprises the combination of an optical-electrical servo system for controlling the dew spot size on a mirror surface and a thermistor positioned relative to said mirror surface and the dew spot to measure the temperature of the mirror surface, the measure of which is the dew point, the improvement comprising a hydrogen glow tube with a lithium fluoride window that produces a light source with a strong emission in the neighborhood of about Lyman-α (1216 A.), an aluminum reflective surface having a magnesium fluoride coating thereon with a reflectivity of about 90% for incident light received from said hydrogen glow tube, first and second ionization chambers sensitive to a narrow band of wavelengths including Lyman-α and insensitive to longer and shorter wavelengths connected to a power supply with their outputs opposing each other, said first ionization chamber positioned to receive light from said light source and light reflected from said reflective surface, said second ionization chamber positioned to receive only light from said source reflected by said reflective surface, and a shutter for adjusting the light from said source to said first ionization chamber to adjust the output of said first ionization chamber whereby the output of said first and second ionization chambers depends on the dew spot on said reflective surface.

4. A detector capable of detecting deposition of a thin film on a reflective surface which comprises a light source with a strong emission in the neighborhood of Lyman-α of about 1216 A. positioned to be incident onto said surface, at least one detector sensitive to Lyman-α and insensitive to longer and shorter wavelengths positioned to receive light reflected by said surface said detector comprising an envelope, a lithium fluoride window, and a nitric oxide filling in said envelope, and an indicator for indicating an output from said detector in accordance with light received by said detector.

References Cited in the file of this patent

UNITED STATES PATENTS

| | | |
|---|---|---|
| 2,638,783 | Rittner et al. | May 19, 1953 |
| 2,671,334 | Gunn | Mar. 9, 1954 |
| 2,720,107 | McBrair | Oct. 11, 1955 |
| 2,831,120 | Weeks | Apr. 15, 1958 |
| 2,909,058 | Hassler et al. | Oct. 20, 1959 |